US008186878B2

(12) United States Patent
Janzen et al.

(10) Patent No.: US 8,186,878 B2
(45) Date of Patent: May 29, 2012

(54) SYSTEM AND METHOD FOR PROVIDING TEMPERATURE DATA FROM A MEMORY DEVICE HAVING A TEMPERATURE SENSOR

(75) Inventors: Jeff W. Janzen, Boise, ID (US); Jeffrey P. Wright, Boise, ID (US); Todd D. Farrell, Boise, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 201 days.

(21) Appl. No.: 12/702,898

(22) Filed: Feb. 9, 2010

(65) Prior Publication Data

US 2010/0142287 A1    Jun. 10, 2010

Related U.S. Application Data

(62) Division of application No. 12/256,315, filed on Oct. 22, 2008, now Pat. No. 7,677,796, which is a division of application No. 11/303,680, filed on Dec. 16, 2005, now Pat. No. 7,441,949.

(51) Int. Cl.
*G01K 7/00* (2006.01)

(52) U.S. Cl. ........ 374/171; 374/170; 374/141; 702/133; 711/170

(58) Field of Classification Search ............... 374/170, 374/178, 171, 172, 173, 141, 1, 2, 152; 712/224; 713/601; 714/718; 365/201, 210, 211, 222, 365/230.2, 189.12, 230.05, 230.1, 233.1, 365/240; 711/1, 100, 170; 702/99, 130–136; 327/512, 513, 536, 537; 324/759, 760, 761, 324/762, 763, 764, 765
See application file for complete search history.

(56) References Cited

U.S. PATENT DOCUMENTS

| 4,389,546 | A | * | 6/1983 | Glisson et al. | 379/67.1 |
| 5,098,200 | A | | 3/1992 | O'Brien et al. | 374/163 |
| 5,483,102 | A | | 1/1996 | Neal et al. | 257/712 |
| 5,644,332 | A | * | 7/1997 | Matsuzaki et al. | 345/100 |
| 5,784,328 | A | | 7/1998 | Irrinki et al. | 365/222 |
| 5,873,053 | A | | 2/1999 | Pricer et al. | 702/130 |
| 5,875,142 | A | | 2/1999 | Chevallier | 365/212 |
| 5,956,350 | A | | 9/1999 | Irrinki et al. | 371/21.1 |
| 6,078,209 | A | | 6/2000 | Linoff | 327/513 |
| 6,173,217 | B1 | | 1/2001 | Bogin et al. | 700/299 |
| 6,281,760 | B1 | | 8/2001 | Koelling et al. | 331/66 |
| 6,341,090 | B1 | * | 1/2002 | Hiraki et al. | 365/200 |
| 6,490,225 | B1 | | 12/2002 | Millar et al. | 365/233 |
| 6,557,072 | B2 | | 4/2003 | Osborn | 711/106 |
| 6,564,288 | B2 | | 5/2003 | Olarig et al. | 711/105 |
| 6,587,913 | B2 | | 7/2003 | Campanale et al. | 711/5 |
| 6,644,770 | B1 | | 11/2003 | Niimura et al. | 347/14 |
| 6,662,136 | B2 | | 12/2003 | Lamb et al. | 702/132 |
| 6,694,282 | B2 | | 2/2004 | Perner | 702/130 |
| 6,707,745 | B2 | | 3/2004 | Mizugaki | 365/222 |
| 6,756,856 | B2 | | 6/2004 | Song et al. | 331/176 |
| 6,778,453 | B2 | | 8/2004 | Cooper et al. | 365/212 |
| 6,788,159 | B2 | | 9/2004 | Takahashi et al. | 331/176 |
| 6,798,706 | B2 | | 9/2004 | Barth et al. | 365/211 |

(Continued)

*Primary Examiner* — Gail Verbitsky
(74) *Attorney, Agent, or Firm* — Lerner, David, Littenberg, Krumholz & Mentlik, LLP (57) ABSTRACT

A circuit and method for providing temperature data indicative of a temperature measured by a temperature sensor. The circuit is coupled to the temperature sensor and configured to identify for a coarse temperature range one of a plurality of fine temperature ranges corresponding to the temperature measured by the temperature sensor and generate temperature data that is provided on an asynchronous output data path.

14 Claims, 5 Drawing Sheets

U.S. PATENT DOCUMENTS

| | | | |
|---|---|---|---|
| 6,809,914 B2 | 10/2004 | Edmonds et al. | 361/93.8 |
| 6,809,978 B2 | 10/2004 | Alexander et al. | 365/211 |
| 6,813,210 B2 | 11/2004 | Okamoto et al. | 365/222 |
| 6,873,509 B2 | 3/2005 | Partsch et al. | 361/103 |
| 6,934,645 B2 | 8/2005 | Kim | 702/64 |
| 6,937,087 B2 | 8/2005 | Sim et al. | 327/512 |
| 7,034,507 B2 | 4/2006 | Lovett | 320/150 |
| 7,099,735 B2 | 8/2006 | Jain et al. | 700/132 |
| 7,180,211 B2 | 2/2007 | Sinha et al. | 307/651 |
| 7,191,088 B1 | 3/2007 | Reed et al. | 702/130 |
| 7,246,022 B2 | 7/2007 | McCall et al. | 702/99 |
| 7,248,527 B2 | 7/2007 | Park | 365/222 |
| 7,277,310 B2 | 10/2007 | Yoon et al. | 365/63 |
| 7,286,432 B2 | 10/2007 | Heilmann et al. | 365/211 |
| 7,324,398 B2 | 1/2008 | Shim et al. | 365/212 |
| 7,512,025 B2 | 3/2009 | Yoon et al. | 365/203 |
| 7,587,559 B2 * | 9/2009 | Brittain et al. | 711/154 |
| 7,594,750 B2 | 9/2009 | Lee et al. | 374/178 |
| 8,041,865 B2 * | 10/2011 | Bruennert et al. | 710/104 |
| 8,042,999 B2 * | 10/2011 | Jeong et al. | 374/170 |
| 2002/0154625 A1 | 10/2002 | Ma | 370/351 |
| 2002/0169924 A1 | 11/2002 | Osborn | 711/106 |
| 2004/0071191 A1 | 4/2004 | Sim et al. | 374/185 |
| 2004/0168036 A1 | 8/2004 | Garlepp et al. | 711/167 |
| 2005/0074051 A1 | 4/2005 | Won et al. | 374/170 |
| 2005/0146965 A1 | 7/2005 | Kim et al. | 365/211 |
| 2005/0162961 A1 * | 7/2005 | Hiraki et al. | 365/222 |
| 2005/0216220 A1 | 9/2005 | Kim | 702/130 |
| 2005/0226309 A1 | 10/2005 | Proll et al. | 374/163 |
| 2006/0095911 A1 | 5/2006 | Uemura et al. | 718/100 |
| 2006/0098509 A1 | 5/2006 | Kim | 365/212 |
| 2006/0218455 A1 * | 9/2006 | LeClair et al. | 714/726 |
| 2009/0187689 A1 | 7/2009 | Roohparvar | 710/100 |
| 2009/0245003 A1 | 10/2009 | Ito | 365/211 |

* cited by examiner

| OUTPUT DATA | | | | | TF=00 | TF=01 | TF=10 | TF=11 |
|---|---|---|---|---|---|---|---|---|
| DQ0 | DQ1 | DQ2 | DQ3 | | 40-55C | 55-70C | 70C-85C | 80C-95C |
| 0 | 0 | 0 | 0 | | <40C | <55C | <70C | <80C |
| 0 | 0 | 0 | 1 | | 40-45C | 55-60C | 70-75C | 80-85C |
| 0 | 0 | 1 | 1 | | 45-50C | 60-65C | 75-80C | 85-90C |
| 0 | 1 | 1 | 1 | | 50-55C | 65-70C | 80-85C | 80-95C |
| 1 | 1 | 1 | 1 | | >55C | >70C | >85C | >95C |

SYSTEM AND METHOD FOR PROVIDING TEMPERATURE DATA FROM A MEMORY DEVICE HAVING A TEMPERATURE SENSOR

CROSS-REFERENCE TO RELATED APPLICATION

This application is a divisional of pending U.S. patent application Ser. No. 12/256,315 filed Oct. 22, 2008, which is a divisional of U.S. patent application Ser. No. 11/303,680, filed Dec. 16, 2005, and issued as U.S. Pat. No. 7,441,949 B2 on Oct. 28, 2008. These applications and patent are each incorporated herein by reference.

TECHNICAL FIELD

The invention relates generally to semiconductor memory devices, and more specifically, to memory devices having an integrated temperature sensor for measuring a temperature related to the memory device and providing output data representative of the measured temperature.

BACKGROUND OF THE INVENTION

A common semiconductor device is a dynamic random access memory ("DRAM") device. The DRAM device is typically used for storing data, for example, in a computer system. Current DRAM devices are designed to operate synchronously in accordance with a system clock, which can have clock frequencies greater than 600 MHz. These devices are referred to as synchronous DRAM ("SDRAM") devices. SDRAM devices can be used in a variety of applications, many of which are in compact environments with adjacent electronics devices in relatively close proximity to the SDRAM devices. A common example of such an environment is a conventional portable laptop computer, where SDRAM devices are enclosed in a small environment with other common computer devices and circuits, such as a microprocessor, a hard-disk drive, power circuits and battery, computer-controller chipsets, CD-ROM/DVD drive, wireless communication devices, and the like.

The computer devices and circuits must be designed to operate over a range of temperatures. During times where many of the devices and circuits are operated simultaneously, or operated for a long period of time, more heat is generated than when the computer is idle, or only a few of the devices or circuits are operating. As one can imagine, in such a small and cramped environment, the temperature in which the different devices and circuits operate can be considerable as a result of the heat that is generated as these devices and circuits operate and consume power. Under some higher temperature conditions, the performance of the various computer devices and circuits begin to degrade. For example, with respect to SDRAM devices, the hold time that data can be stored without the need to rewrite, or "refresh" the data, decreases as the operating temperature increases. In severe operating conditions, the temperature may be sufficient to cause some cells, which have acceptable hold characteristics under lower temperature conditions, to fail. Additionally, transistors included in the circuitry of the SDRAM devices may not be capable of providing the same drive current or switch at the same speed under higher temperature conditions, causing SDRAM device performance to degrade.

Various cooling methods are utilized to manage the temperature in which the computer devices and circuits operate. Some more common cooling methods utilized are providing a sufficient number of vents in a computer case to allow heat to escape, including electric fans which are activated when certain temperature conditions are met to create a cooling air flow for the devices and circuits, and thermal shut-down circuitry that will automatically shut-down, or discontinue operation of the computer to prevent irreparable damage to the computer devices and circuits from occurring. Another approach has been the use of devices and circuits that operate at lower voltages, or that are more energy efficient, to reduce power consumption. An obvious benefit is increasing the time battery-operated computers can be used. However, another benefit from reducing power consumption is reducing the amount of electrical energy that is transformed into heat energy during operation of the devices and circuits. Generating less heat generally results in lower operating temperatures.

A more recent proposal, with specific application for memory devices, such as SDRAM devices, is to design memory devices that include an integrated temperature sensor that is used to measure the temperature of the memory device. The memory device can be commanded to output data representative of the operating temperature condition as measured by the integrated temperature sensor. Based on the output data of the memory device, measures can be taken to maintain operability of the memory device, including actions to maintain or reduce the operating temperature of the memory device, or change operating conditions, such as increase refresh rate of the memory device. For example, if a memory controller receives data from a memory device having a temperature sensor indicating that a critical temperature has been exceeded, the memory controller can force the memory device into an idle state until the temperature is reduced to a sufficient level to resume operation.

Various protocols have been suggested as to the format of the data output by a memory device having a temperature sensor. One example is providing data having only a binary state, with one state indicating that the measured temperature of the memory device is below a temperature threshold value and the other state indicating that the measured temperature is above the temperature threshold. Although the output data of the memory device can be easily interpreted to provide an indication of the measured temperature relative of a single temperature threshold, this approach may be unacceptable where data representing greater temperature resolution is desired.

Another approach provides data having only a binary state indicative of measured temperature relative to a plurality of programmable temperature thresholds. In this approach, greater temperature resolution can be provided by the two-state data in comparison to the single temperature threshold approach by programming at least two temperature thresholds, one temperature threshold representing the upper boundary of a temperature range and another temperature threshold representing the lower boundary of the temperature range. In interpreting the output data of the memory device, one state of the data represents the condition that the measured temperature is within the programmed temperature range and the other state of the data represents the condition that the measure temperature is outside of the programmed temperature range. Alternatively, one of the states of the data can represent that the measured temperature has not crossed any of the temperature thresholds and a signal pulse of the other state represents the times at which the measured temperature crosses one of the programmed temperature thresholds. Although the data under this approach provides easily interpreted data having greater temperature resolution than the single temperature threshold approach, the state of the output data does not directly indicate if the measured temperature is greater than or less than the programmed temperature range, but simply whether the measured temperature is within the programmed temperature range. Thus, where even greater temperature resolution is desired, the previously described approach will be unacceptable. Additionally, programming the temperature thresholds adds complexity to the set-up and operation of memory devices having this feature.

One other approach to providing temperature data from an integrated temperature sensor is to output a data word that represents the temperature measured by the temperature sensor. The data word is sequentially output from several data input/output concurrently to provide redundancy confirmation, and timed with respect to a temperature command provided to the memory device in order for the correct bits of the data word to be latched. Although the temperature resolution provided by this approach is greater than the previously described approaches, the timing of sequentially outputting the bits of the data word and latching the same is much more critical for accurately interpreting the temperature data. If either the output or latching of the sequence of bits of the data word is not timed correctly, for example, beginning a clock cycle early or late, the wrong bits will be interpreted as the temperature value. Additionally, sequentially outputting the data word can interfere with normal read and write operations that occur immediately following the output of the temperature data.

Therefore, there is a need for a system and method of providing temperature information from an integrated temperature sensor that provides adequate temperature resolution and ease in interpreting the temperature data.

SUMMARY OF THE INVENTION

The present invention is directed to a circuit and method providing temperature data indicative of a temperature measured by a temperature sensor. In one aspect of the present invention, the temperature sensor is integrated in a semiconductor device and the circuit is coupled to the temperature sensor and configured to convert a measured temperature of the temperature sensor into temperature data that identifies for a current coarse temperature range one of a plurality of fine temperature ranges corresponding to the measured temperature. In another aspect of the present invention, the circuit includes an output driver circuit coupled to a register storing the temperature data and to a plurality of output terminals that is configured to output the temperature data to output terminals asynchronously and to output other data synchronously.

In another aspect of the present invention, a method for monitoring a temperature measured by a temperature sensor integrated with a semiconductor circuit is provided. The method includes setting a current coarse temperature range to a minimum coarse temperature range, and receiving temperature data from the semiconductor circuit. The temperature data from the semiconductor circuit identifies one of a plurality of fine temperature ranges corresponding to the temperature measured by the temperature sensor. In response to the temperature data identifying a fine temperature range corresponding to a range overflow condition for the current coarse temperature range, the current coarse temperature range is switched to a higher coarse temperature range. In response to the temperature data representing a fine temperature range corresponding to a range underflow condition for the current coarse temperature range, the current coarse temperature range is switched to a lower coarse temperature range. Where the current coarse temperature range is not switched, and the critical temperature is not exceeded, a fine temperature range corresponding to the temperature measured by the temperature sensor is determined from the current coarse temperature range and the temperature data.

DETAILED DESCRIPTION OF PREFERRED EMBODIMENTS

Embodiments of the present invention are directed to a temperature data output circuit and method for a semiconductor device having an integrated temperature sensor. Certain details are set forth below to provide a sufficient understanding of the invention. However, it will be clear to one skilled in the art that the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
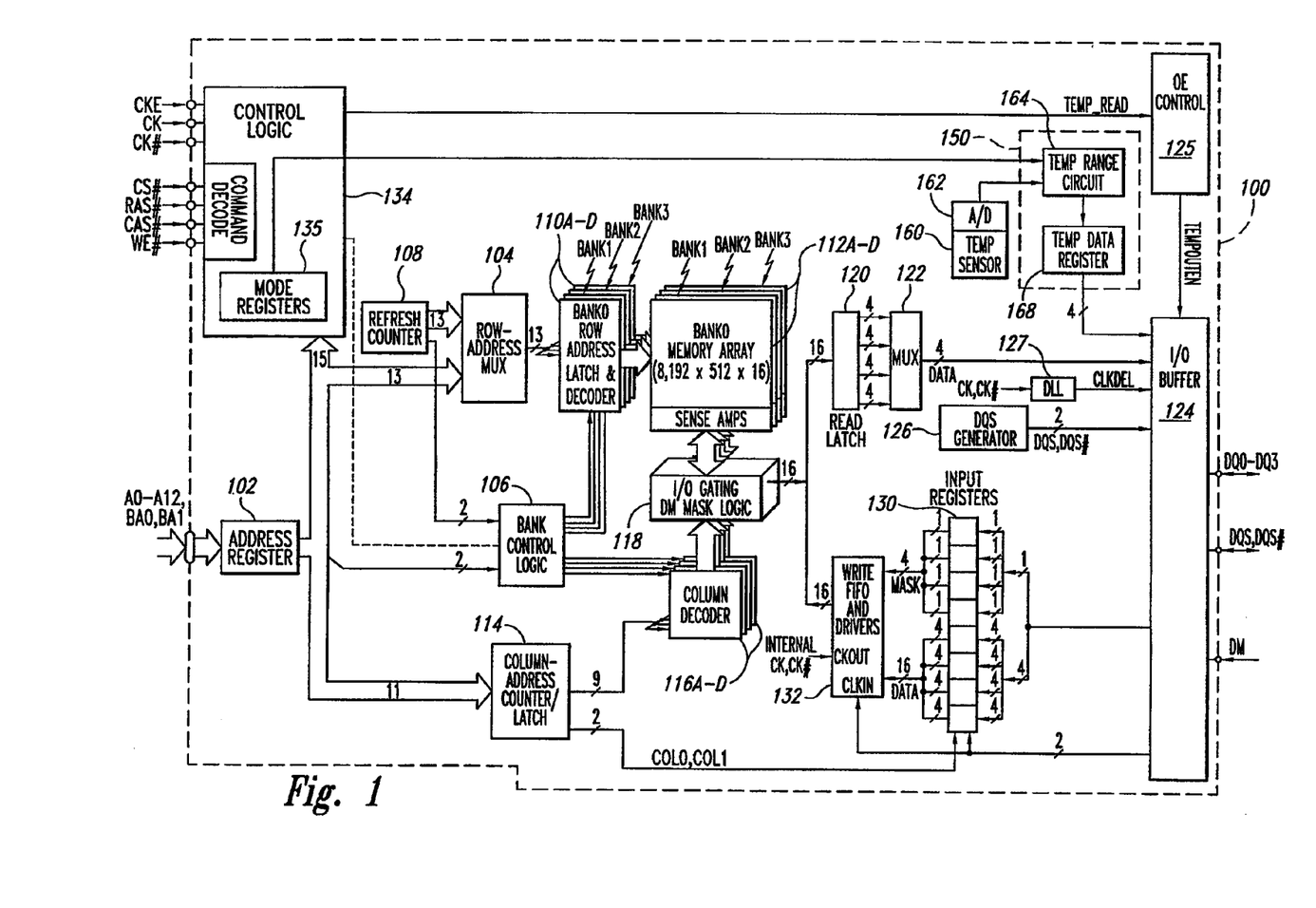
FIG. 1 is a functional block diagram of a SDRAM device including a temperature data output circuit according to an embodiment of the present invention.

FIG. 1 illustrates a memory device in which a temperature data output circuit 150 according to an embodiment of the present invention is implemented. Application of the principles described herein, however, is not limited to only memory devices that include an integrated temperature sensor and may be applied in other integrated circuits as well. A general description of the memory device 100 and its operation is provided below, and will be followed by a more detailed description of the temperature output circuit according to an embodiment of the present invention.

The memory device 100 in FIG. 1 is a double-data rate ("DDR") SDRAM. The memory device 100 is referred to as a double-data-rate device because the data words being transferred to and from the memory device 100 are transferred at double the rate of a conventional SDRAM, which transfers data at a rate corresponding to the frequency of the applied clock signal. The memory device 100 includes a control logic and command decoder 134 that receives a plurality of command and clocking signals over a control bus, typically from an external circuit such as a memory controller (not shown). The command signals include a chip select signal CS#, a write enable signal WE#, a column address strobe signal CAS#, and a row address strobe signal RAS#, while the clocking signals include a clock enable signal CKE# and complementary clock signals CLK, CLK#, with the "#" designating a signal as being active low. The command signals CS#, WE#, CAS#, and RAS# are driven to values corresponding to a particular command, such as a read, write, or auto-refresh command. The command decoder 134 includes a mode register 135 that can be programmed to set various modes of operation of the memory device 100. One of the fields (not shown) in the mode register 135 that will be discussed in greater detail below is a temperature range field TR for storing a value that selects one of a plurality of coarse temperature ranges.

In response to the clock signals CLK, CLK#, the command decoder 134 latches and decodes an applied command, and generates a sequence of clocking and control signals for control components 102-132 to execute the function of an applied command. The clock enable signal CKE enables clocking of the command decoder 134 by the clock signals CLK, CLK#. The memory device 100 further includes an address register 102 that receives row, column, and bank addresses over an address bus, with a memory controller (not shown) typically supplying the addresses. The address register 102 receives a row address and a bank address that are applied to a row address multiplexer 104 and bank control logic circuit 106, respectively. The row address multiplexer 104 applies either the row address received from the address register 102 or a refresh row address from a refresh counter 108 to a plurality of row address latch and decoders 110A-D. The bank control logic 106 activates the row address latch and decoder 110A-D corresponding to either the bank address received from the address register 102 or a refresh bank address from the refresh counter 108, and the activated row address latch and decoder latches and decodes the received row address.

The activated row address latch and decoder 110A-D applies various signals to a corresponding memory bank 112A-D to thereby activate a row of memory cells corresponding to the decoded row address in response to the decoded row address. Each memory bank 112A-D includes a memory-cell array having a plurality of memory cells arranged in rows and columns, and the data stored in the memory cells in the activated row is stored in sense amplifiers in the corresponding memory bank. The row address multiplexer 104 applies the refresh row address from the refresh counter 108 to the decoders 110A-D. The bank control logic circuit 106 uses the refresh bank address from the refresh counter when the memory device 100 operates in an auto-refresh or self-refresh mode of operation in response to an auto- or self-refresh command being applied to the memory device 100, as will be appreciated by those skilled in the art.

A column address is applied on the address bus after the row and bank addresses, and the address register 102 applies the column address to a column address counter and latch 114 which, in turn, latches the column address and applies the latched column address to a plurality of column decoders 116A-D. The bank control logic 106 activates the column decoder 116A-D corresponding to the received bank address, and the activated column decoder decodes the applied column address. Depending on the operating mode of the memory device 100, the column address counter and latch 114 either directly applies the latched column address to the decoders 116A-D, or applies a sequence of column addresses to the decoders starting at the column address provided by the address register 102. In response to the column address from the counter and latch 114, the activated column decoder 116A-D applies decode and control signals to an I/O gating and data masking circuit 118 which, in turn, accesses memory cells corresponding to the decoded column address in the activated row of memory cells in the memory bank 112A-D being accessed.

During a data read command, data is read from the addressed memory cells and coupled through the I/O gating and data masking circuit 118 to a read latch 120. The I/O gating and data masking circuit 118 supplies N bits of data to the read latch 120, which then applies four N/4 bit words to a multiplexer 122. As shown in FIG. 1, the circuit 118 provides 16 bits to the read latch 120 which, in turn, provides four 4-bit words to the multiplexer 122. An I/O buffer 124 sequentially receives the N/4 bit words DATA from the multiplexer 122 and also receives a data strobe signal DQS from a strobe signal generator 126 and a delayed clock signal CLKDEL from the delay-locked loop ("DLL") 127. The I/O buffer 124 includes driver circuits (not shown in FIG. 1) that are coupled to receive the N/4 bit words DATA applied to the I/O buffer 124 and which are clocked by the CLKDEL signal. The DQS signal is used by an external circuit such as a memory controller (not shown) for synchronizing receipt of read data during read operations. In response to the delayed clock signal CLKDEL, the driver circuits of the I/O buffer 124 sequentially output the received DATA on data terminals DQ0-DQ3 as a corresponding data word. Each data word is output onto a data bus in synchronism with rising and falling edges of a CLK signal that is applied to clock the memory device 100. The I/O buffer 124 also outputs the data strobe signal DQS having rising and falling edges in synchronism with rising and falling edges of the CLK signal, respectively.

During data write operations, an external circuit such as a memory controller (not shown) applies N/4 bit data words to the data terminals DQ0-DQ3, the strobe signal DQS, and corresponding data masking signals DM on the data bus. Receiver circuits (also not shown in FIG. 1) in the I/O buffer 124 are coupled to the data terminals DQ0-DQ3 to receive the data words. The I/O buffer 124 receives each data word and the associated DM signals, and applies these signals to input registers 130 that are clocked by the DQS signal. In response to a rising edge of the DQS signal, the input registers 130 latch a first N/4 bit data word and the associated DM signals, and in response to a falling edge of the DQS signal the input registers latch the second N/4 bit data word and associated DM signals. The input register 130 provides the four latched N/4 bit data words as an N-bit word to a write FIFO and driver 132, which clocks the applied data word and DM signals into the write FIFO and driver in response to the DQS signal. The data word is clocked out of the write FIFO and driver 132 in response to the CLK signal, and is applied to the I/O gating and masking circuit 118. The I/O gating and masking circuit 118 transfers the data word to the addressed memory cells in the accessed bank 112A-D subject to the DM signals, which may be used to selectively mask bits or groups of bits in the data words (i.e., in the write data) being written to the addressed memory cells.

The memory device 100 further includes a temperature sensor 160 for measuring a temperature of the memory device 100. Preferably, the temperature sensor 160 is integrally formed with the memory device 100 and measures its operating temperature. The temperature sensor 160 is conventional in design and operation. For example, conventional semiconductor temperature sensors can be utilized, such as temperature sensors utilizing diode, transistor, thermistors, and the like. The temperature sensor 160 generates a current or voltage signal having a magnitude that is temperature dependent, as known in the art. A conventional analog-to-digital converter ("ADC") 162 coupled to the temperature sensor 160 converts the analog current or voltage signal into a digital binary value TEMP that is provided to the temperature data output circuit 150. The temperature data output circuit 150 includes a temperature range circuit 164, which as will be explained in more detail below, translates the TEMP value output by the ADC 162 into four-bit temperature output data TEMP_DATA based on a selected coarse temperature range. The coarse temperature range is selected based on the value programmed in the temperature range field TR in the mode register 135.

The TEMP_DATA is stored in a temperature data register 168 that is coupled to the driver circuits of the I/O buffer 124. In response to receiving and decoding a temperature read command, the command decoder 134 generates an active temperature read signal TEMP_READ that is provided to an OE control circuit 125. The OE control circuit 125 in turn generates an active temperature output enable signal TEMPOUTEN that switches the driver circuits to couple the TEMP_DATA to the data terminals DQ0-DQ3 from which the TEMP_DATA can be read.

Figure 2:
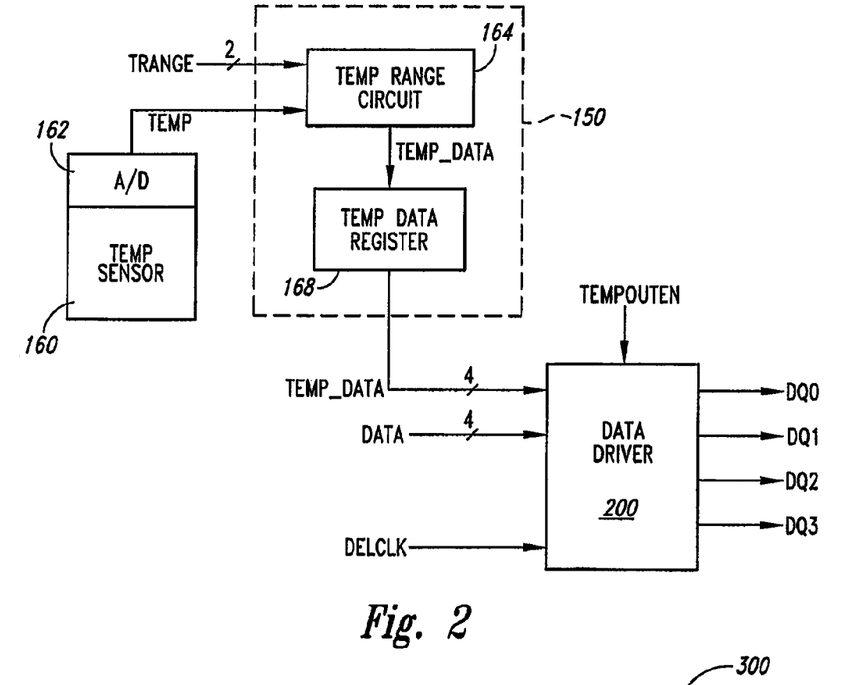
FIG. 2 is a functional block diagram of a temperature data output circuit according to an embodiment of the present invention.

FIG. 2 illustrates the temperature sensor 160 and the ADC 162, the temperature data output circuit 150 and a data driver 200 included in the I/O buffer 124 (FIG. 1). As previously discussed, the temperature sensor 160 generates a current or voltage signal having a magnitude based on a measured temperature, which is converted by the ADC 162 into the digital TEMP value representative to the magnitude of the current or voltage signal. The TEMP value is provided to the temperature range circuit 164 of the temperature data output circuit 150 to translate the value into four-bit data TEMP_DATA. The TEMP_DATA generated by temperature range circuit 164 will depend on which one of the temperature ranges is selected by a programmable value set in the temperature range field TR in the mode register 135 (FIG. 1). As shown in FIG. 2, a TRANGE signal representing a two-bit value programmed in the TR field in the mode register 135, is used to select one of the temperature ranges of the temperature range circuit 164. Based on the temperature range selected by the TRANGE signal, the temperature range circuit 164 translates the TEMP value into the appropriate TEMP_DATA. The TEMP_DATA is provided to the temperature data register 168 for storage. The TEMP_DATA can be generated by the temperature range circuit 164 periodically so that the TEMP_DATA stored by the temperature data register 168 is current. The frequency of updating the TEMP_DATA should be sufficient to provide adequate time resolution in order for corrective measures to be taken in response to increases and decreases in temperature. However, non-periodic updating of the TEMP_DATA can be performed as well, for example, having the TEMP_DATA updated in response to a memory device operation such as a auto-refresh operation.

As previously described, the data driver 200 is further coupled to receive DATA from the multiplexer 122 (FIG. 1), which are clocked into the data driver 200 and coupled to the data terminals DQ0-DQ3 in response to the DELCLK signal provided by the DLL 127. The data driver 200 is further coupled to the temperature data register 168 to receive the TEMP_DATA. Each of the four-bits of the TEMP_DATA is coupled to a respective one of the data terminals DQ0-DQ3 when the TEMPOUTEN signal provided by the OE control circuit 125 is active. A two-input multiplexer (not shown) controlled by the TEMPOUTEN signal can be used for each data terminal DQ0-DQ3 to select between the respective bit of the DATA and TEMP_DATA.

In contrast to the synchronous data path used to clock the DATA into the data driver 200 and couple the same to the data terminals DQ0-DQ3, the TEMP_DATA is coupled to the data terminals DQ0-DQ3 through an asynchronous output path. The TEMP_DATA generally remains valid on the data terminals DQ0-DQ3 as long as the TEMPOUTEN signal is active. Thus, it is not critical to synchronize when the TEMP_DATA is made available on the data terminals DQ0-DQ3 and when the TEMP_DATA is read since the temperature output data is not sequentially output on the data terminals DQ0-DQ3. The TEMP_DATA can be read by strobing the data terminals DQ0-DQ3 at any time during the time the TEMP_DATA is coupled to the data terminals DQ0-DQ3. By having the TEMP_DATA coupled to the data terminals DQ0-DQ3 through the asynchronous data path rather than through the synchronous data path of DATA, the issues previously described with respect to the prior art approaches to providing temperature output data can be avoided.

As previously discussed, the four-bit TEMP_DATA output by the temperature range circuit 164 in response to the TEMP data from the ADC 162 depends on the coarse temperature range selected. The coarse temperature ranges that are used by the temperature range circuit 164 can be preset in order to simplify operation of the temperature data output circuit 150. That is, the temperature range circuit 164 for the memory device 100 is preprogrammed with coarse temperature ranges and does not have to be programmed by the user to obtain a temperature reading, thus, avoiding any setup requirements. However, in alternative embodiments of the present invention, at least one of the coarse temperature ranges can be programmed by the user to tailor the temperature range as desired. The coarse temperature ranges can be preprogrammed to default coarse temperature ranges, and can be overwritten by user programmable coarse temperature ranges.

Figure 3:
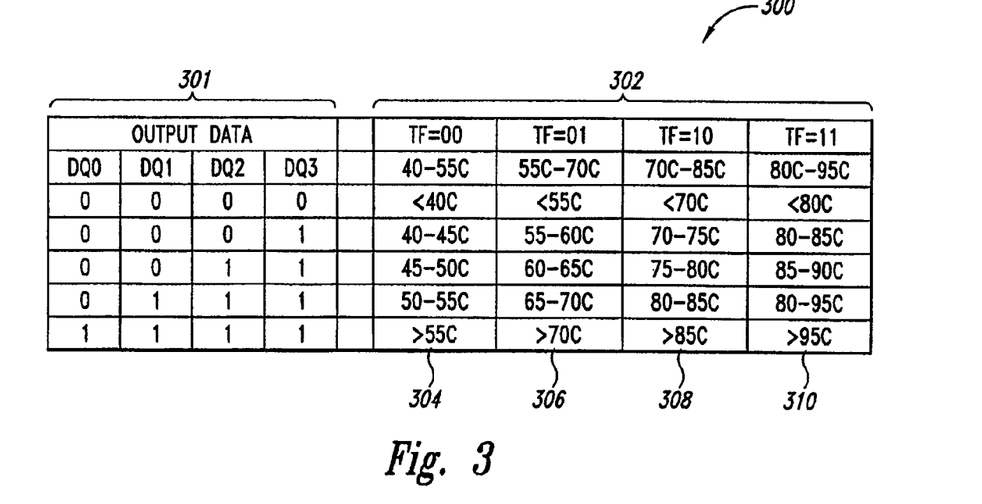
FIG. 3 is a table of programmable temperature data ranges for the temperature data output circuit included in the SDRAM device of FIG. 1.

FIG. 3 illustrates a table 300 having examples of four preset coarse temperature ranges 302 for the temperature range circuit 164. A first coarse temperature range 304 is defined for 40 degrees Celsius ("° C.") to 55° C. and is selected by a TRANGE signal corresponding to a "00" value programmed for the temperature range field in the mode register 135 (TR=00). A second coarse temperature range 306 is defined for 55° C. to 70° C. and is selected by a TRANGE signal corresponding to a "01" value (TR=01), a third coarse temperature range 308 is defined for 70° C. to 85° C. and is selected by a TRANGE signal corresponding to a "10" value (TR=10), and a fourth coarse temperature range 310 is defined for 80° C. to 95° C. and is selected by a TRANGE signal corresponding to a "11" value (TR=11). Also shown in table 300 are the four-bit TEMP_DATA 301 provided to the temperature data register 168 by the temperature range circuit 164 in response to receiving the digital TEMP data from the ADC 162. The four-bit TEMP_DATA 301 can represent one of five different fine temperature ranges within a coarse temperature range 302. The fine temperature ranges define ranges of temperatures within a coarse temperature range. Although the number of fine temperature ranges for each of the coarse temperature ranges shown in FIG. 3 is the same, it is not necessary for this symmetry to exist. Additionally, although the TEMP_DATA is shown in FIG. 3 as being encoded using a four-bit binary number for identifying one of five different fine temperature ranges, the TEMP_DATA can be encoded as a binary value as well. That is, the binary value is decoded to identify a fine temperature range. For example, two bits can be used to identify one of four different fine temperature ranges. An advantage with the binary encoding scheme is that a fewer number of bits can be used to decode nearly the same number of fine temperature ranges.

In the present example, although the TEMP_DATA identifies only five different fine temperature ranges, using different coarse temperature ranges allows the TEMP_DATA to provide temperature information for a much greater gross temperature range while maintaining good temperature resolution. As shown in table 300 of FIG. 3, the same four-bit TEMP_DATA can be used to identify several different fine temperature ranges. For example, a TEMP_DATA of "0011"

represents a measured temperature in the fine temperature range between 45° C. and 50° C. for the coarse temperature range 304. However, the same four-bit TEMP_DATA of "0011" represents a measured temperature in the fine temperature range between 75° C. and 80° C. for the coarse temperature range 308. Thus, the TEMP_DATA generated by the temperature range circuit 164 depends on the current coarse temperature range. Additionally, a device receiving the TEMP_DATA will have a record of the current coarse temperature range information in order to correctly interpret the TEMP_DATA. The coarse temperature range information can be maintained by the receiving device in several ways. For example, the receiving device programmed the TR value and has kept track of that value, or the current TR value is provided to the receiving device by another device tracking the current coarse temperature range. In another embodiment, the TR field in the mode register 135 is polled to obtain the current TR value.

As illustrated by table 300, the two bits to select a coarse temperature range 302 and four-bit temperature output data can be used to provide a temperature reading over a gross temperature range of 40° C. to 95° C. with 5° C. resolution. Note that the gross temperature range includes a 5° C. overlap between the coarse temperature ranges 308 (70° C. to 85° C.) and 310 (80° C. to 95° C.). Although it is not necessary to have such an overlap, the 5° C. overlap is provided between the coarse temperature ranges 308 and 310 to avoid unnecessarily switching between the coarse temperature ranges 308 and 310 when the memory device is operating under typical temperatures, which is generally between 80° C. and 85° C. Since both the coarse temperature ranges 308 and 310 cover the typical operating temperature, the need to switch back and forth between the two overlapping coarse temperature ranges can be reduced. However, if desirable, the preset coarse temperature ranges can be modified to be all non-overlapping, and/or non-sequential and still remain within the scope of the present invention. Additionally, fewer or greater number of TR bits and bits for TEMP_DATA can be used to provide fewer or greater coarse and/or fine temperature ranges.

Figure 4:
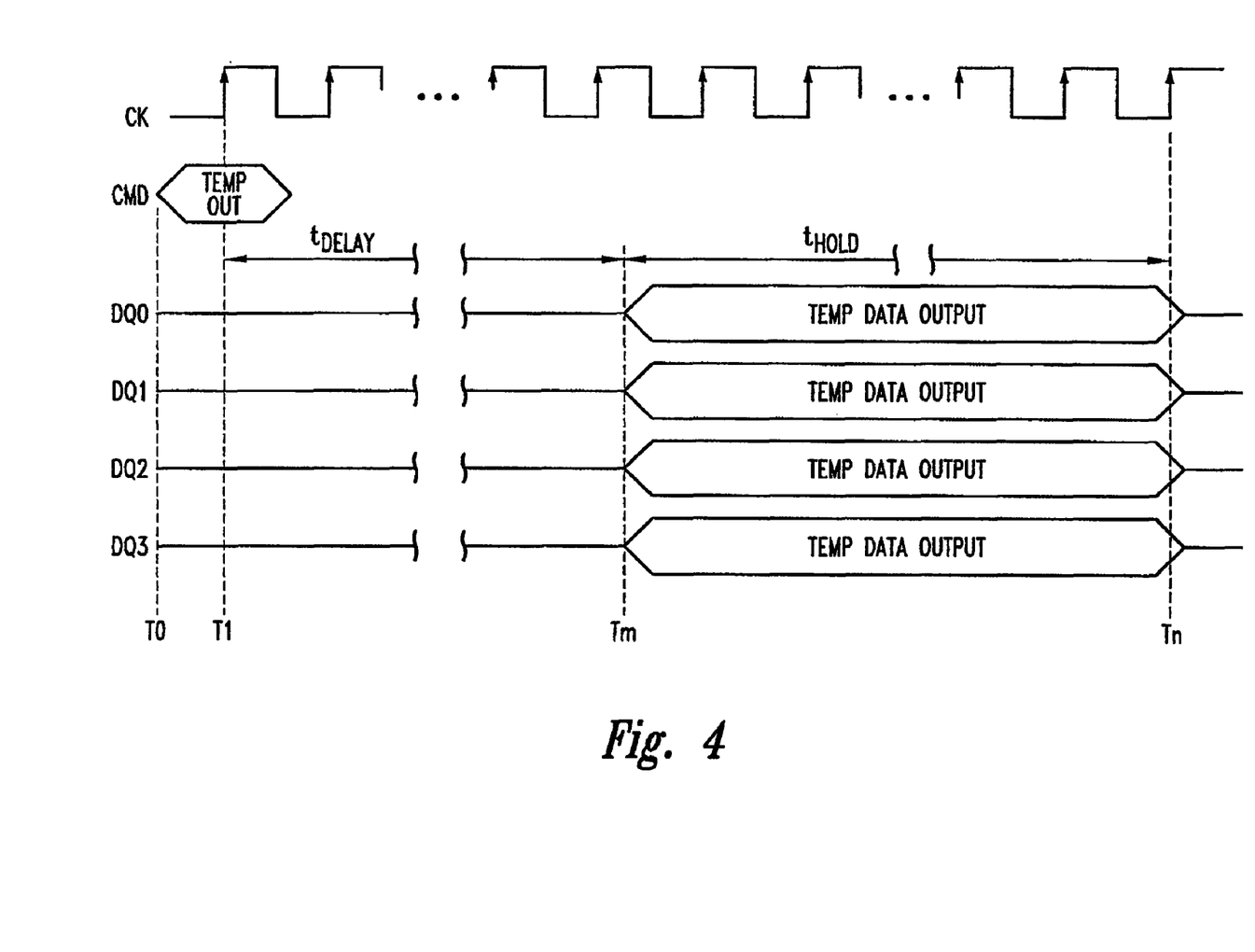
FIG. 4 is a timing diagram of various signals during the operation of the temperature data output circuit included in the SDRAM device of FIG. 1.

FIG. 4 is a timing diagram illustrating various signals related to issuing a temperature data read command to the memory device 100 (FIG. 1). At time T0, a temperature data out TEMPOUT command is applied to the command terminals of the memory device 100. The TEMPOUT command is latched at a next rising edge of the CK signal (i.e., at time T1) by the command decoder 134 and decoded. In response, an active TEMP_READ control signal (not shown in FIG. 4) is generated by the command decoder 134 to initiate the temperature data output process. After a time delay of Tdelay, the four-bit TEMP_DATA stored in the temperature data register 168 is made available at the data terminals DQ0-DQ3 at time Tm. During Tdelay, the synchronous data path is cleared and the data driver 200 (FIG. 2) is switched by the OE control circuit 125 to couple the TEMP_DATA to the data terminals DQ0-DQ3. Each bit of the TEMP_DATA is provided on a respective one of the data terminals DQ0-DQ3. As previously described, the TEMP_DATA is provided through an asynchronous output path. The bits of the TEMP_DATA are not sequentially output on the data terminals DQ0-DQ3 and remain valid for a temperature data hold time Thold. During Thold, the TEMP_DATA can be strobed by a receiving device to obtain a temperature reading of the memory device 100. With respect to the coarse and fine temperature ranges shown in table 300 of FIG. 3, the TEMP_DATA corresponds to one of the 5° C. fine temperature ranges of the selected preset 15° C. coarse temperature ranges 302. The receiving device decodes the TEMP_DATA based on the coarse temperature range information it has tracked to obtain the correct temperature value. At a time Tn, Thold time has elapsed and the TEMP_DATA is no longer valid on the data terminals DQ0-DQ3.

The timing diagram of FIG. 4 illustrates the timing of command signals and the TEMP_DATA hold time for an embodiment of the present invention. However, the timing and use of command signals can be modified for alternative embodiments. For example, although not shown in FIG. 4, a command can be used to terminate the availability of the TEMP_DATA at the data terminals DQ0-DQ3. That is, rather than having the Thold time as a preset time period after which expires, the TEMP_DATA is no longer available, the TEMP_DATA can remain valid indefinitely until a temperature data out terminate command is issued to the memory device 100. This embodiment provides even less timing constraints on reading the TEMP_DATA. In another embodiment, rather than issuing the TEMPOUT command only once to initiate the temperature data output process, the TEMPOUT command is issued for the entire time (i.e., for each clock cycle of the CK signal) it is desirable for the TEMP_DATA to be made available. When another command is latched and decoded by the command decoder 134, the TEMP_DATA is no longer available.

Other modifications can also be made without departing from the scope of the present invention. For example, although not shown in FIG. 4, a deselect command (where WE is unasserted) of a no operation NOP command can be issued for every clock cycle of the CK signal after the TEMPOUT command is issued during the time the TEMP_DATA is made available. Although the TEMP_DATA output path is asynchronous, providing a NOP command for each cycle of the CK signal can ensure that spurious memory commands are not latched by the command decoder 134 during the time the TEMP_DATA is made available.

In other embodiments, the temperature data output process can be executed concurrently with another memory device operation that does not require the use of the data driver 200 (FIG. 2). For example, when a TEMPOUT command is issued to the memory device, a conventional auto-refresh operation can be performed for memory cells of the memory array 112A-D (FIG. 1) by issuing an auto-refresh command to the memory device 100 while waiting for the temperature data. In another embodiment, non-essential circuits are disabled during the temperature data output process, such as the DLL 127. Since the TEMP_DATA is provided on an asynchronous output path that does not require a CLKDEL signal for clocking purposes.

Although various embodiments of the invention have been described herein, additional modifications to the timing of signals, issuance of commands, and the duration of the TEMP_DATA can still be made without departing from the scope of the present invention.

Figure 5:
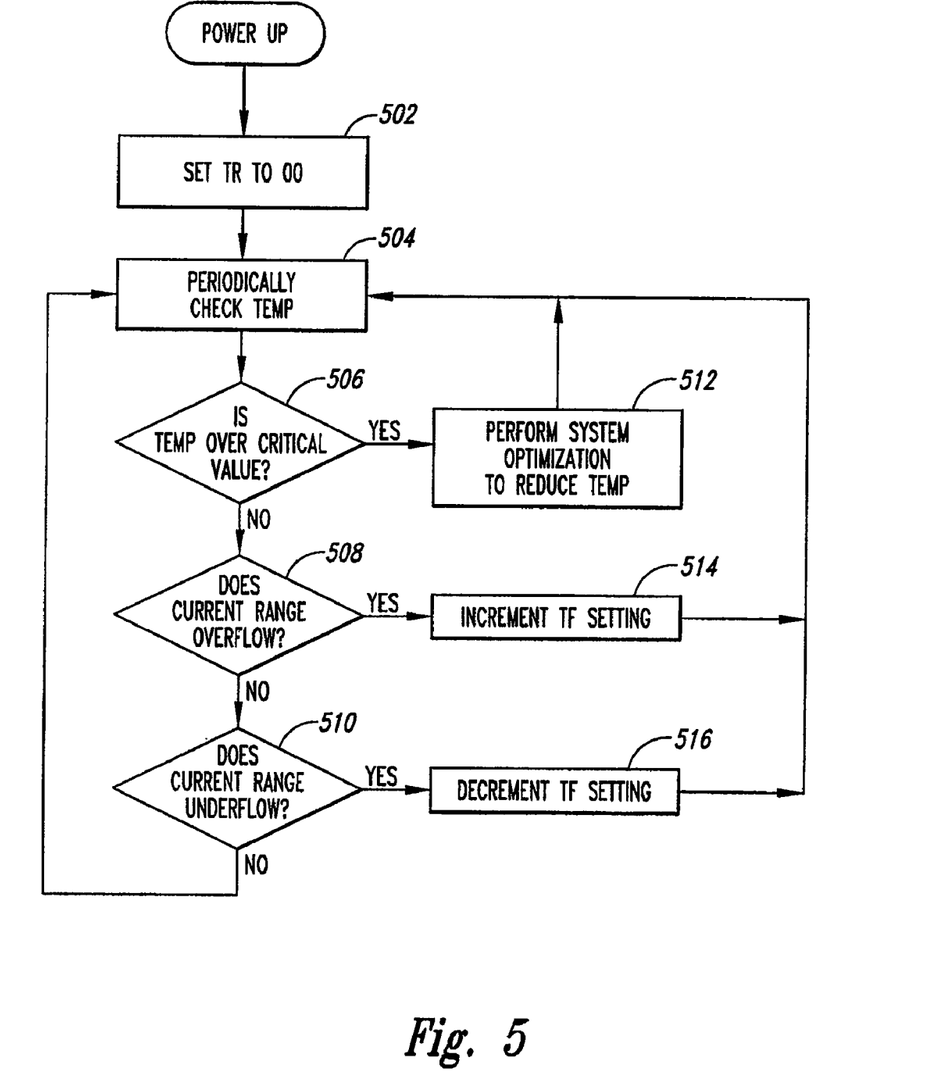
FIG. 5 is a flow diagram illustrating operation according to an embodiment of the present invention of the temperature data output circuit included in the SDRAM device of FIG. 1.

FIG. 5 illustrates a flow diagram for taking a temperature reading from the memory device 100 according to an embodiment of the present invention. Following power-up of the memory device 100, at step 502. The TR field in the mode register is set to "00", which in the present example represents the lowest coarse temperature range. With respect to the coarse temperature ranges illustrated in table 300 of FIG. 3, the "00" value selects the coarse temperature range 304 defined for 40° C. to 55° C. At step 504 the temperature is checked by issuing a temperature data out command to the memory device 100. The command will typically be issued by a memory controller, however, in some applications, the device issuing the temperature data output command and receiving the TEMP_DATA can be a memory-hub controller, memory module controller, or the like. In the present example, the receiving device will be represented by a memory controller. In response to the temperature data out command, a four-bit TEMP_DATA output is provided on the data terminals DQ0-DQ3 and is latched by the memory controller. At steps 506, 508, and 510, the memory controller analyzes the combination of bits of the TEMP_DATA to determine if any course of action should be taken. At step 506, the TEMP_DATA is analyzed to determine whether the measured temperature is greater than a critical temperature value. The critical temperature value is typically the greatest temperature value of the gross temperature range. In the present example, where the coarse and fine temperature ranges, and the four-bit TEMP_DATA coding of table 300 are being used, the critical temperature 95° C. In the event that the TEMP_DATA represents a temperature greater than the critical temperature, the memory controller performs a system optimization procedure at step 512 to reduce the temperature of the memory device 100. The condition that causes this to occur, with reference to table 300, is when all four bits of the TEMP_DATA are "1", and TR=11. As previously described, the device receiving the TEMP_DATA maintains a record of the current coarse temperature range to correctly interpret the TEMP_DATA. The temperature of the memory device 100 is checked at a later time at step 504 to monitor the progress of cooling. Examples of the system optimization that can be performed include forcing the memory device 100 into an idle state until the temperature is reduced to an acceptable level, or activating a fan to promote airflow for cooling the memory device. Other processes now known or later developed for reducing the temperature of the memory device 100 can be used as well.

Where the TEMP_DATA does not represent a temperature greater than the critical temperature, at step 508 the memory controller analyzes the TEMP_DATA to determine if the temperature exceeds the maximum temperature for the current coarse temperature range (i.e., range overflow condition). In the present example, TEMP_DATA having four "1" bits indicates that the temperature as measured by the temperature sensor 160 is in excess of the current range. Under this condition, the memory controller increments the TR value stored in the mode register 135 to select the next greatest preset coarse temperature range at step 514. The new TR value, or some information indicative of the new coarse temperature range, is recorded by the memory controller so that the next TEMP_DATA it receives will be correctly interpreted. The memory controller then returns to step 504 to check the temperature at a later time, which because of the change in coarse temperature range, the four-bit TEMP_DATA will correspond to one of the fine temperature ranges in the new coarse temperature range.

If, however, the TEMP_DATA does not represent a temperature greater than the maximum temperature for a coarse temperature range, the memory controller analyzes the TEMP_DATA at step 510 to determine whether the TEMP_DATA represents a temperature less than the minimum temperature of the current coarse temperature range (i.e., range underflow condition). In the present example, this condition exists if the four bits of the TEMP_DATA are "0". If an under-range conditions does exist, at step 516 the memory controller proceeds to decrement the TR value stored in the mode register 135 to adjust to a lower coarse temperature range. As with the case where the TR is incremented, the new decremented TR value, or some information indicative of the new lower coarse temperature range, is recorded by the memory controller so that the next TEMP_DATA it receives will be correctly interpreted. It can be assumed that the minimum TR value is 00, and a decrement command does not change the TR value to another value. The memory controller then returns to step 504 to check the temperature at a later time, which because of the change to a lower coarse temperature range, the four-bit TEMP_DATA will correspond to one of the fine temperature ranges in the lower coarse temperature range.

Where an under-range condition is not present, the TEMP_DATA will represent data corresponding to a fine temperature range. Assuming the coarse and fine ranges defined in table 300, the four-bit TEMP_DATA will represent measured temperature to within a 5° C. fine temperature range over a gross temperature range between 40° C. and 95° C. The level of temperature resolution and the expanse of the gross temperature range should be sufficient for most applications. However, as previously stated, the coarse and fine ranges can be adjusted to provide the level of temperature resolution and expanse of gross temperature range that is desired.

Figure 6:
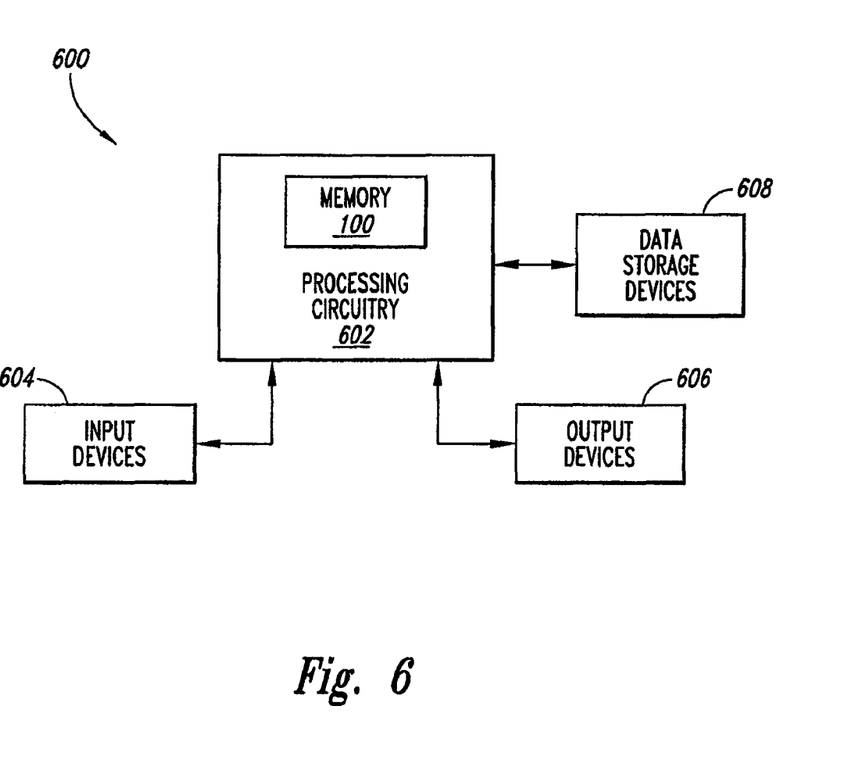
FIG. 6 is a block diagram of a processor-based system including a memory device having a temperature data output circuit according to an embodiment of the present invention.

FIG. 6 is a block diagram of a processor-based system 600 having processing circuitry 702 that includes the memory device 100 of FIG. 1. Typically, the processing circuitry 702 is coupled through address, data, and control buses to the memory device 100 to provide for writing data to and reading data from the memory device. The processing circuitry 702 includes circuitry for performing various computing functions, such as executing specific software to perform specific calculations or tasks. In addition, the processor-based system 700 includes one or more input devices 704, such as a keyboard or a mouse, coupled to the processing circuitry 702 to allow an operator to interface with the processor-based system 700. Typically, the processor-based system 700 also includes one or more output devices 706 coupled to the processing circuitry 702, such as output devices typically including a printer and a video terminal. One or more data storage devices 708 are also typically coupled to the processing circuitry 702 to store data or retrieve data from external storage media (not shown). Examples of typical storage devices 708 include hard and floppy disks, tape cassettes, compact disk read-only ("CD-ROMs") and compact disk read-write ("CD-RW") memories, and digital video disks ("DVDs").

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:
1. A memory device, comprising:
an address bus;
a control bus;
a data bus;
a plurality of output terminals;
an address decoder coupled to the address bus;
a read/write circuit coupled to the data bus;
a control circuit coupled to the control bus;
a memory-cell array coupled to the address decoder, control circuit, and read/write circuit;
an output buffer coupled to the data bus and to the plurality of output terminals;
a temperature sensor for measuring a temperature of the memory device; and
a temperature data output circuit coupled to the output buffer and further coupled to the temperature sensor, the temperature data output circuit configured to convert a measured temperature of the temperature sensor into temperature data that identifies for a current coarse tem- perature range one of a plurality of fine temperature ranges corresponding to the measured temperature.

2. The memory device of claim 1 wherein the output buffer comprises an output driver circuit coupled to the temperature data output circuit and a plurality of output terminals, the output driver circuit configured to output the temperature data to output terminals asynchronously and to output other data synchronously.

3. The memory device of claim 2 wherein the output driver circuit comprises a plurality of driver circuits coupled to a respective one of the output terminals, each driver circuit having a first input coupled to the temperature data output circuit and a second input coupled to the data bus, and further having an input clock node at which a clock signal is applied and an input selection node coupled to the control circuit at which a selection signal is applied, each driver circuit configured to couple the respective first input to the respective output terminal in response to the selection signal having a first state, and further configured to couple the respective second input to the respective output terminal in response to the selection signal having a second state and in accordance with the clock signal to provide data received on the data bus to the output terminal in synchronicity with the clock signal.

4. The memory device of claim 1 wherein the temperature data output circuit comprises a temperature data output circuit configured to receive a selection signal that selects the current coarse temperature range, the current coarse temperature range selected from a plurality of preset coarse temperature ranges in accordance with the selection signal.

5. The memory device of claim 4, further comprising a mode register coupled to the temperature range circuit of the temperature data output circuit, the mode register configured to store data in a coarse temperature range field, the selection signal corresponding to the data stored in the coarse temperature range field.

6. The memory device of claim 4 wherein at least two of the preset coarse temperature ranges have an overlap in temperature ranges.

7. The memory device of claim 4 wherein the selection signal represents a binary number, and the preset coarse temperature ranges are arranged in increasing coarse temperature ranges which are selected by increasing the binary number.

8. A processor-based system, comprising:
a data input device;
a data output device;
a processor coupled to the data input and output devices; and
a memory device coupled to the processor, the memory device comprising,
an address bus;
a control bus;
a data bus;
a plurality of output terminals;
an address decoder coupled to the address bus;
a read/write circuit coupled to the data bus;
a control circuit coupled to the control bus;
a memory-cell array coupled to the address decoder, control circuit, and read/write circuit;
an output buffer coupled to the data bus and to the plurality of output terminals;
a temperature sensor for measuring a temperature of the memory device; and
a temperature data output circuit coupled to the output buffer and further coupled to the temperature sensor, the temperature data output circuit configured to convert a measured temperature of the temperature sensor into temperature data that identifies for a current coarse temperature range one of a plurality of fine temperature ranges corresponding to the measured temperature.

9. The processor-based system of claim 8 wherein the output buffer comprises an output driver circuit coupled to the temperature data output circuit and a plurality of the output terminals, the output driver circuit configured to output the temperature data asynchronously and output other data synchronously.

10. The processor-based system of claim 9 wherein the output driver circuit comprises a plurality of driver circuits coupled to a respective one of the output terminals, each driver circuit having a first input coupled to the temperature data output circuit and a second input coupled to the data bus, and further having an input clock node at which a clock signal is applied and an input selection node coupled to the control circuit at which a selection signal is applied, each driver circuit configured to couple the respective first input to the respective output terminal in response to the selection signal having a first state, and further configured to couple the respective second input to the respective output terminal in response to the selection signal having a second state and in accordance with the clock signal to provide data received on the data bus to the output terminal in synchronicity with the clock signal.

11. The processor-based system of claim 8 wherein the temperature data output circuit comprises a temperature data output circuit configured to receive a selection signal that selects the current coarse temperature range, the current coarse temperature range selected from a plurality of preset coarse temperature ranges in accordance with the selection signal.

12. The processor-based system of claim 11, further comprising a mode register coupled to the temperature range circuit of the temperature data output circuit, the mode register configured to store data in a coarse temperature range field, the selection signal corresponding to the data stored in the coarse temperature range field.

13. The processor-based system of claim 11 wherein at least two of the preset coarse temperature ranges have an overlap in temperature ranges.

14. The processor-based system of claim 11 wherein the selection signal represents a binary number, and the preset coarse temperature ranges are arranged in increasing coarse temperature ranges which are selected by increasing the binary number.

* * * * *